Aug. 19, 1958 H. FRIEDMAN ET AL 2,848,624
SPECTROCHEMICAL ANALYSIS DEVICE
Filed Nov. 10, 1953 3 Sheets-Sheet 1
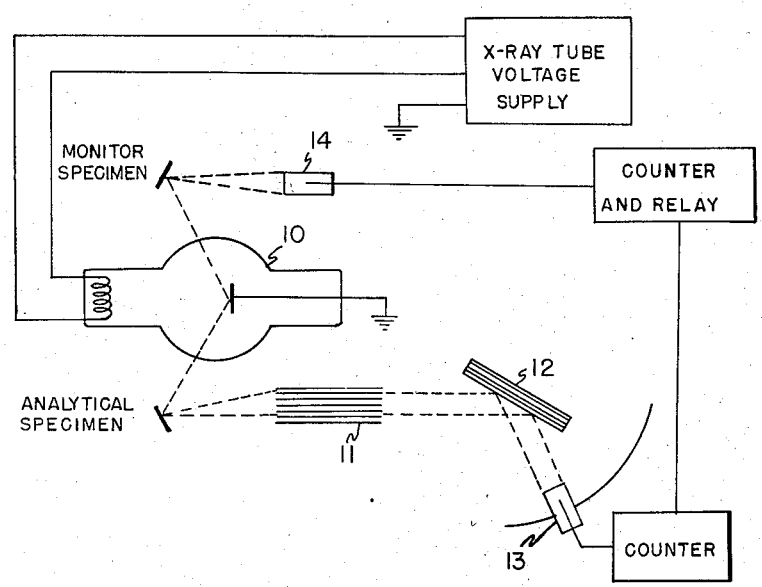
Fig. 1.
 
Fig. 1a Fig. 1b.
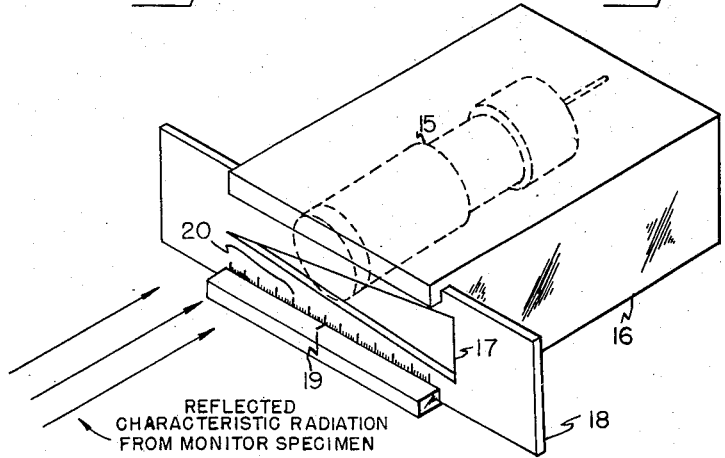
Fig. 3.
INVENTORS.
HERBERT FRIEDMAN
JOHN J. MAGUIRE
BY
ATTORNEY Aug. 19, 1958     H. FRIEDMAN ET AL     2,848,624
SPECTROCHEMICAL ANALYSIS DEVICE
Filed Nov. 10, 1953     3 Sheets-Sheet 2
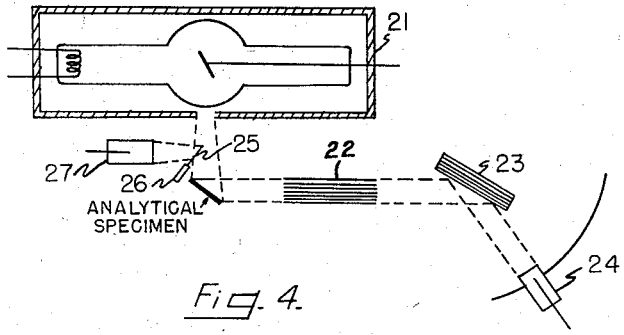
Fig. 4.
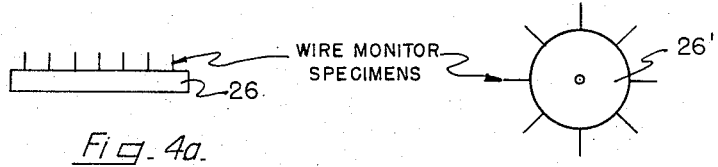 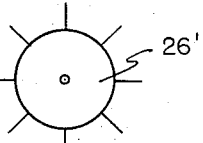
Fig. 4a.            Fig. 4b.
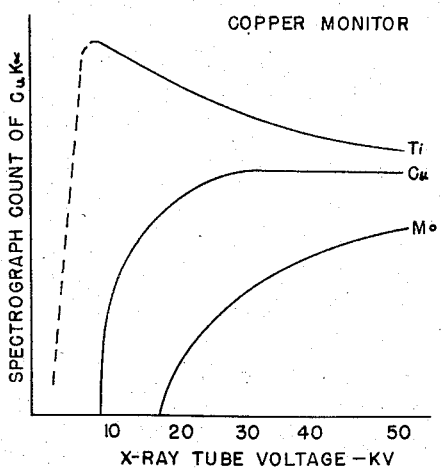 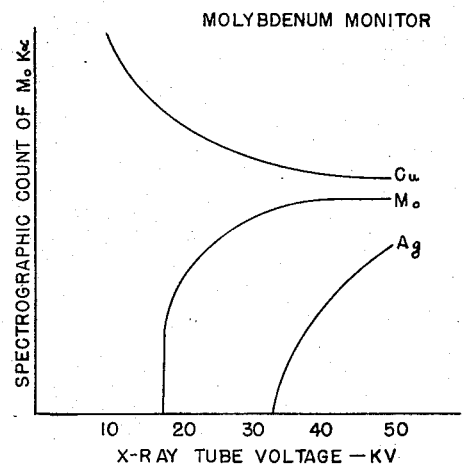
Fig. 2a            Fig. 2b.
*INVENTOR.*
HERBERT FRIEDMAN
JOHN J. MAGUIRE
BY
ATTORNEY Aug. 19, 1958 H. FRIEDMAN ET AL 2,848,624
SPECTROCHEMICAL ANALYSIS DEVICE
Filed Nov. 10, 1953 3 Sheets-Sheet 3

INVENTORS.
HERBERT FRIEDMAN
JOHN J. MAGUIRE
BY
ATTORNEY

United States Patent Office 2,848,624
Patented Aug. 19, 1958

2,848,624

SPECTROCHEMICAL ANALYSIS DEVICE

Herbert Friedman, Arlington, Va., and John J. Maguire, Washington, D. C., assignors, by mesne assignments, to J. J. Maguire, trading as J. J. Maguire Company, Washington, D. C.

Application November 10, 1953, Serial No. 391,358

26 Claims. (Cl. 250—71)

This invention relates to X-ray devices for spectrochemical analysis and particularly to novel means for monitoring the dosage applied to test specimens.

More particularly the invention concerns dosage monitor devices which comprise a source of primary radiations, a test specimen, a spectrograph detecting system comprising a detector and counter for the fluorescent radiations from the test specimen, and a monitor system comprising a detector and counter for the monitoring radiations. A relay device is connected to the counter of the monitor system of the device and acts to interrupt the count of the spectrograph detecting system upon a predetermined count being made by the monitor detecting system.

In the dosage monitoring systems of this invention no particular attempt is made to regulate or to maintain constant either the intensity or quality of primary radiations applied to the test specimen. There is provided, however, in the monitor detecting system means interposed between the source of primary radiations and the monitor counting means whereby the monitor counting means counts only radiations having substantially the same quality as the radiations in the spectrograph detecting system, whether they be the particular quality of primary radiations which are effective in producing fluorescent radiations from the test sample or the fluorescent radiations from the monitor test specimen. Stated another way, the means interposed between the source of primary radiations and the monitor counting means transmits to that counting means only pulse of amplitude proportional to the energy of quanta counted by the spectrograph detector.

One method for accomplishing the above is to have the monitor detecting system detect and count only fluorescent radiations from a monitor specimen having approximately the same atomic number as that of the element under consideration in the test specimen. Another method of accomplishing the same end result is to have the monitor system detect directly the primary radiations but employ a quantum counter such as a proportional counter or scintillation counter followed by a pulse height selector which will discriminate in such a way as to count only those pulses which are proportional to the energy of primary radiations which are effective in producing the fluorescent radiations detected by the spectrograph detecting system.

Another object of the invention is a novel means of mounting a plurality of monitor specimens of different atomic numbers for selective use in one of the above described systems.

Another object of the invention is the use of a monitor specimen for one of the above described systems in the form of a fine wire placed directly in the beam of primary radiations.

Still another feature of the invention is a means to vary the rate of admission of monitoring radiations to the monitor detector to vary the dosage applied to a test specimen for a given count of the monitor detecting system. Calibrated scale means associated with the above variable means provides for adjustment whereby, as described hereinafter, the final count of the spectrograph detector may be digits which directly correspond to the percentage content in the test specimen of the particular element under consideration.

The above, and other more detailed objects of the invention will become apparent from a description of the drawings in which:

Fig. 1 is a schematic diagram of a dosage monitor system embodying a monitor specimen and a plural window source of primary radiations;

Figs. 1a and 1b are enlarged views of a slide and a wheel arrangement respectively for mounting a plurality of monitor specimens of different atomic numbers;

Figs. 2a and 2b are curves illustrative of the dependence of measured count in the spectrograph as a function of X-ray tube voltage;

Fig. 3 is a view of one form of means to vary the rate of admission of monitor radiations to the monitor detector;

Fig. 4 is a schematic showing of a portion of a dosage monitor system similar to Fig. 1 but showing the use of a fine wire monitor specimen and a single window source of radiations;

Figs. 4a and 4b are enlarged views of a slide and a wheel arrangement respectively for mounting a plurality of fine wire monitor specimens of different atomic numbers;

Figure 5:
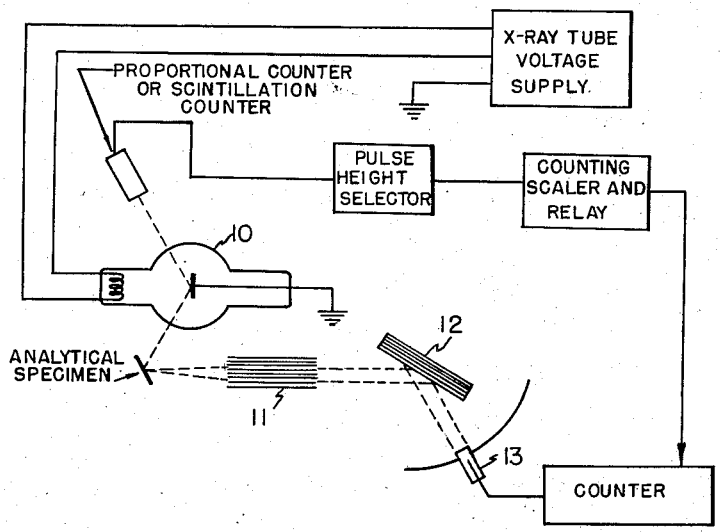
Fig. 5 is a schematic showing of a dosage monitor device embodying a proportional counter or scintillation counter followed by a pulse height selector in the monitor detector system and a plural window source of primary radiations.

X-ray spectrochemical analysis with electronic intensity measurements requires precise stabilization of the primary X-ray beam intensity during the course of a series of measurements. The primary X-ray intensity depends on the tube current and the applied high voltage. If both these quantities are well stabilized, the X-ray intensity will be correspondingly stabilized. In practice it is difficult to provide a current stabilizer which acts fast enough to correct for large spontaneous bursts of current such as occur with gasing of aging tubes. Unless the high voltage supply provides a D. C. voltage, it is difficult to stabilize the out-put voltage directly. Most X-ray generators supply raw A. C. or at best full wave rectified but unfiltered voltage to the X-ray tube. In such cases, stabilization usually consists of line voltage regulation in the input circuit to the high voltage transformer and does not provide a complete safeguard against high voltage drift due to temperature changes, warm-up time, etc.

As an alternative to the above stabilizers, the X-ray beam may be sampled with an ionization chamber or other suitable intensity measuring device. Variations in ion chamber output may then be applied as corrections to a control circuit in the input to the X-ray transformer in such a way as to maintain stable output. The patent to H. Friedman No. 2,542,022 relates to such a stabilizing system in which the radiations of a particular frequency band are regulated. If the X-ray tube has two or more windows, one of them may be used for the monitored beam and it is then unnecessary to disturb the X-ray spectrograph geometry by inserting the ion chamber of the monitor system in its primary beam.

In X-ray fluorescense spectroscopy the specimen to be analyzed is irradiated with the primary beam of an X- ray tube. Under irradiation by the hard X-rays in the primary beam, the specimen fluoresces softer X-ray wave lengths characteristic of the elements of which it is composed. If the primary X-ray intensity remains constant in magnitude and quality during the course of measurements of intensities of several fluorescent spectrum lines, successive measurements of the various line intensities can be compared to obtain the relative concentrations of the corresponding elements in the specimen, since the relative line intensities are roughly proportional to the relative concentrations.

In the dosage monitor method described herein no attempt is made to stabilize the intensity of the X-ray beam. Instead, the energies in the X-ray spectrum lines are compared for equal doses of primary radiation delivered to the specimen. The use of pulse counters, which may take the form of G. M. tubes, proportional counters, or scintillation counters, for the spectrograph and monitor detectors makes possible a very flexible dosage monitor arrangement. The counting rate of the monitor is kept relatively high so that its total count for the fixed dose is always many times larger than the spectrograph count. This will insure that the statistical error in the monitored dose is always negligible compared to that in the spectrograph count. In making a measurement, the detector in the spectrograph and the monitor detector are started counting simultaneously; after the monitor reaches its prescribed fixed count it activates a relay which stops the spectrograph count. If the X-ray tube has two or more windows, the monitor can sample the direct beam from one of the unused windows.

The measurements in the spectrograph are of monochromatic X-ray lines, and fluctuations in X-ray tube voltage will affect the various line intensities differently than they will affect the total X-ray spectrum from the target of the tube. This is because the total spectrum radiation is approximately proportional to the voltage applied to the tube whereas the line intensities are more nearly proportional to the square of the voltage excess over the critical excitation voltage for any given wave length.

In order to improve the monitor control it is desirable to at least monitor the same wave length of X-rays as is being measured in the spectrograph. The monitoring could be done perfectly only if the monitored radiation were derived from an identical specimen in a duplicate spectrograph arrangement. Almost perfect monitoring is obtainable, however, by measuring directly the fluorescense of a sample made up of an element of atomic number fairly close to that of the element being measured in the spectrograph. Fig. 1 illustrates an arrangement of spectrograph and monitor. Primary X-rays from tube 10 strike the monitor specimen and the specimen to be analyzed. A collimator 11, an analyzer crystal 12, and a spectrograph detector 13 are shown. The fluorescent rays from the monitor specimen are directed to a monitor detector 14. The fluorescent radiations from the monitor detector are counted and after a predetermined count the relay indicated in Fig. 1 is operated to interrupt the counter of the detector 13. The relay may be additionally effective to interrupt the voltage supply to the X-ray tube 10. Since the monitor specimen has approximately the same atomic number as that of the specimen to be analyzed, any variation in the rate or quality of the primary X-ray emission from the tube 10 will affect detectors 13 and 14 alike and hence the dosage applied to the analytical specimen will be independent of such variations. By variations in quality is meant a variation in the rate of emission of X-rays from the tube 10 in any of the frequencies in the spectrum of emitted rays including, and most importantly, those within the narrow band most effective on the analytical and monitor specimens in the production of fluorescent radiations which are to be counted.

Figure 6:
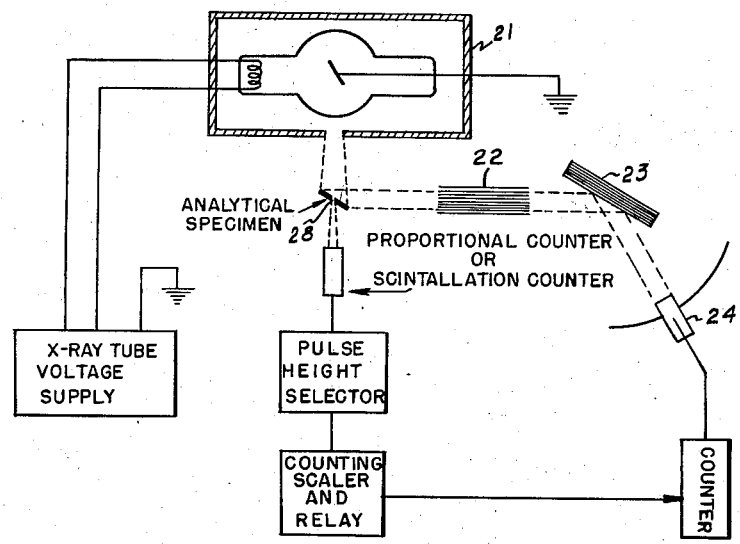
Fig. 6 shows a system similar to that of Fig. 5 but one which employs a single window source of primary radiations.

In Fig. 1, as well as in Figs. 5 and 6, the counter is indicated in block diagram since the specific form taken is not critical to the invention. It may take any of the forms well known in the art insofar as the invention is concerned. For example, it may consist of a counting scaler comprising a group of bistable or flip-flop components which are known as "scale of two" counters where in, depending on the number of components contained, the number of pulses required to register a count in the output will be some power of two. Alternatively, the counter may be a charging counter of the type wherein a capacitive element is charged in stepped sequence by succeeding pulses until a prescribed potential is reached, whereupon a count is caused to be made. Still another form of counter which may be employed is one which may be used with an ionization chamber, the direct current output of which may be integrated by a suitable integrating circuit which in turn initiates a count upon the integral reaching a prescribed amount.

The monitor specimen may be carried on a slide or wheel together with other monitor elements, permitting a choice sufficient to cover the spectrum. Fig. 1a shows several monitor specimens arranged on a slide. Fig. 1b shows the monitor specimens on a wheel. Each provides a ready means to select a monitor specimen to suit the particular specimen to be analyzed. Figs. 2a and 2b show the dependence of measured count in the spectrograph as a function of tube voltage and different monitor elements. When the element being measured in the spectrograph and the monitor element are the same, the measured count is almost independent of variations in tube voltage. The monitor circuit begins to count as soon as primary X-rays are produced because some of these are scattered to the monitor from the monitor sample. The spectrograph detector receives no radiation until the applied voltage exceeds the critical excitation voltage corresponding to the element whose lines are being measured. As soon as this critical voltage is exceeded, the monitored count and the spectrograph count become almost identically dependent on the voltage applied to the X-ray tube. If the monitor element is of lower or higher atomic number than the element to be measured by the spectrograph the curves of the monitor count and the spectrograph count versus the X-ray tube voltage in each case will not parallel one another until a much higher applied voltage is reached. This will be apparent from Figs. 2a and 2b, the atomic numbers of titanium, copper, molybdenum and silver being 22, 29, 42 and 47 respectively.

By providing a wedge slit in front of the monitor detector it is possible to adjust the monitor counting rate over a wide range. In routine analysis, it is possible to adjust the monitor rate so that the count registered on the detector will be some convenient number. For example, if the samples are being analyzed for nickel in the range 25 to 35 percent, the monitor wedge can be adjusted until the count obtained for 30 percent Ni is 3000 counts. The counts for 25% and 35% will be very nearly 2500 and 3500 respectively. In practice, therefore, the operator can read the first two digits directly as the percentage and the following digits as the decimal fraction percent. If the higher accuracy of a greater count is desired the monitored dose can be increased until the recorded counts are 25,000 to 35,000 for the 25–35% range. Fig. 3 shows such an arrangement. The monitor detector 15 is housed in a casing 16 the front of which has a wedge slit 17 which may be adjusted with respect to the front of the detector 15. As shown, the wedge slit may be carried by a slidable cover 18. A reference mark 19 and suitable indicia is provided so that the wedge slit may be adjusted to a setting which will indicate a number on the indicia 20 which corresponds to the approximate percent content in the specimen to be analyzed of a particular element such as copper, molybdenum, etc. Thus, the indicating means which is responsive to the movement of cover 18 is calibrated with respect to various approximate percentages of elements contained in a test specimen so that for a given setting of the cover 18 the final count of the spectrograph detector is a direct digital indication of the percentage content of a particular element in the test specimen.

Although Fig. 3 shows a wedge slit as the means to vary the monitored dose, it will be understood that other specific means may be substituted which come within the purview of the invention. For example, a series of holes graduated in size will serve the purpose, or the cover 18 may embody a variable filter element.

There are certain disadvantages in the method of monitoring which may be called "opposite window" monitoring in which the monitor beam is derived from one window of the X-ray source while the beam directed to the analytical specimen is derived from another window of that source. Most X-ray spectrographs now in use employ X-ray tubes with only one window, and, accordingly, this invention is concerned in part with the method of monitoring from the beam which is reflected from the test specimen. This presents the problem of introducing the fluorescent specimen for the monitor in the primary beam without obstructing the beam to the spectrograph specimen. Fig. 4 shows such an arrangement. The single window source of X-rays is shown at 21. The collimator, crystal and spectrograph detector are indicated at 22, 23 and 24, respectively. The wire monitor specimen 25 is mounted on a suitable holder 26 and the monitor detector is shown at 27. It is apparent that 27 may either be a detector similar to 14 if the system is of the type shown in Fig. 1, or a proportional counter or scintillation counter, if the system is of the type shown in Figs. 5 and 6. The holder 26 may take the form of either a slide as shown in Fig. 4a or a wheel as shown in Fig. 4b.

By providing several decade ranges on the monitor counter scale factors may be adjusted to suit the percentage ranges of analyses ranging from trace elements to major constituents. For example it may be desirable to count for 1000 seconds on a trace element, and only 10 seconds on a major constituent of the test sample. In the former case to cite an example, the fixed monitor count may be set for 1,000,000 and in the latter case for only 10,000.

In a focusing spectrograph arrangement or any other arrangement where several detector tubes simultaneously record more than one wave length, the monitoring systems described above are equally applicable. In order to make all of the detectors in a focusing spectrograph record percentages of the various elements in direct reading counts, each detector is provided with an adjustable aperture which is set with the aid of a standard specimen to produce the desired count.

An alternative method of providing means interposed between the source or primary radiations and the counting means of the monitor detector system which will transmit to the counting means pulse energy proportional only to the source pulse energy counted by the spectrograph detector is shown in Figs. 5 and 6. The alternative method of these figures does not require the use of a monitor specimen. Fig. 5 shows the method applied to a plural window source of primary X-rays while Fig. 6 shows the method embodied in a single window source.

Referring first to Fig. 5, the source 10, collimator 11, crystal 12 and spectrograph detector 13 are similar to the system of Fig. 1. Instead of the monitor specimen and detector 15 of Fig. 1, however, there is shown a quantum counter which may take the form of a proportional counter or scintillation counter receiving some of the primary X-rays covering the entire spectrum of the source 10. The output of the proportional counter or scintillation counter, however, is applied to a pulse height selector which may be adjusted or selected to pass only those pulses which correspond to radiations which are substantially within the narrow band of frequencies which band contains only the frequencies of the primary beam which most efficiently excite fluorescent rays from the analytical or test specimen. Hence, the system of Fig. 5, like that of Fig. 1, is independent of variations in the rate or quality of radiations delivered by the source 10.

The purpose of selecting a proportional counter or scintillation counter in the method of Figs. 5 and 6 is that in each of those detectors the amplitudes of the pulse outputs are proportional to the frequencies of the radiations which are detected.

In Fig. 6, which shows a single window source 21, collimator 22, crystal 23 and spectrograph detector 24 corresponding to Fig. 4, a portion of the primary radiations is applied to a proportional counter or scintillation counter whose output is applied to a counting scaler and relay through a pulse height selector as in Fig. 5. Fig. 6 shows one suitable method of directing some of the primary radiations from a single window source to the monitor detector system which comprises a hole 28 drilled through the test specimen.

It is to be understood that the present invention is not confined to the particular embodiments thereof herein illustrated and described which are for exemplary purposes only but embraces various other modifications thereof as are within the spirit and scope of the following claims.

We claim:

1. A device for spectrochemical analysis comprising, a source of primary radiations, a test specimen on which primary radiations are directed, a spectrograph detecting system comprising a detector and counter detecting and counting respectively fluorescent radiations from said test specimen, a monitor detecting system comprising a monitor detector and monitor counting means detecting and counting respectively the monitor radiations derived from said source, a relay device connected to said monitor counting means, the contacts of said relay being operated to interrupt the counting of said spectrograph detecting system upon a predetermined count being made by said monitor counting means, and means interposed between said source of primary radiations and said monitor counting means causing said last named means to count only radiations having substantially the same quality and being proportional to the quantity of the radiations of said spectrograph detecting system.

2. A device for spectrochemical analysis comprising a source of primary radiations, a test specimen to be analyzed on which a portion of said primary radiations are directed, a spectrograph detector receiving and counting fluorescent rays from said test specimen, a monitor system comprising a monitor detector and monitor counting means detecting and counting radiations derived from said source, a relay connected to said monitor counting means, said relay stopping the count of said spectrograph detector when a predetermined count has been made by the counting means of said monitor detector, and means interposed between said source of primary radiations and said monitor counting means transmitting to said counting means pulse amplitude proportional to the energy of quanta counted by said spectrograph detector.

3. A device for spectrochemical analysis comprising a source emitting a single beam of primary radiations, a test specimen to be analyzed on which a portion of said radiation is directed, a spectrograph detector positioned to receive and count the fluorescent rays emanating from said test specimen, a monitor specimen on which a portion of the radiations from said beam are directed, a monitor detector positioned to receive and count the fluorescent rays emanating from said monitor specimen, a relay connected to said monitor detector, said relay stopping the count of said spectrograph detector when a predetermined count has been made by said monitor detector, said monitor specimen being preselected to have an atomic number substantially close to that of said specimen to be analyzed whereby the count of said spectrograph detector will be substantially independent of variations in the rate or quality of radiation emission from said source of radiations during the counting of said fluorescent rays.

4. The device according to claim 3 in which said monitor specimen is in the form of a wire positioned in said single beam of primary radiations.

5. The device according to claim 4 in which said wire is supported on a slide which also carries other wire monitor specimens of different atomic numbers, said slide being movable so that any one of said wire monitor specimens may selectively be positioned in said beam of primary radiations.

6. The device according to claim 4 in which said wire is supported on a wheel which also carries other wire monitor specimens of different atomic numbers, said wheel being rotatable so that any one of said wire monitor specimens may selectively be positioned in said beam of primary radiations.

7. In a monitored spectrograph device comprising a source of primary X-rays, a specimen to be analyzed, means directing said primary X-rays to said specimen, spectrograph detecting means counting the fluorescent radiations emanating from said specimen resulting from said primary X-rays directed thereto, and a monitor system comprising a monitor specimen, means directing primary X-rays from said source to said monitor specimen, and a monitor detector receiving and counting the fluorescent radiations emanating from said monitor specimen resulting from said primary X-rays directed thereto, a support for several said monitor specimens of different atomic numbers, said support being in the form of a slide movable to position selected ones of said monitor specimens to have said primary radiations directed thereagainst.

8. The device according to claim 7 in which each of said monitor specimens is in the form of a wire.

9. In a monitored spectrograph device comprising a source of primary X-rays, a specimen to be analyzed, means directing said primary X-rays to said specimen, spectrograph detecting means counting the fluorescent radiations emanating from said speciment resulting from said primary X-rays directed thereto, and a monitor system comprising a monitor specimen, means directing primary X-rays from said source to said monitor specimen, and a monitor detector receiving and counting the fluorescent radiations emanating from said monitor specimen resulting from said primary X-rays directed thereto, a support for several said monitor specimens of different atomic numbers, said support being in the form of a wheel rotatable to position selected one of said monitor specimens to have said primary radiations directed thereagainst.

10. The device according to claim 9 in which each of said monitor specimens is in the form of a wire.

11. In a monitored spectrograph device comprising a source emitting a single beam of primary X-rays, a specimen to be analyzed positioned in said beam of primary X-rays, spectrograph detecting means counting the fluorescent radiations from said specimen, and a monitor system comprising a monitor specimen also positioned in said beam of primary X-rays, and a monitor detector receiving and counting the fluorescent radiations from said monitor specimen, a support for several said monitor specimens of different atomic numbers, said support being in the form of a slide movable to position selected ones of said monitor specimens in said beam of primary X-rays.

12. The device according to claim 11 in which each of said monitor specimens is in the form of a wire.

13. In a monitored spectrograph device comprising a source emitting a single beam of primary X-rays, a specimen to be analyzed positioned in said beam of primary X-rays, spectrograph detecting means counting the fluorescent radiations from said specimen, and a monitor system comprising a monitor specimen also positioned in said beam of primary X-rays, and a monitor detector receiving and counting the fluorescent radiations from said monitor specimen, a support for several said monitor specimens of different atomic numbers, said support being in the form of a wheel rotatable to position selected ones of said monitor specimens in said beam of primary X-rays.

14. The device according to claim 13 in which each of said monitor specimens is in the form of a wire.

15. A device for spectrochemical analysis comprising a source of primary radiations, a test specimen to be analyzed on which a portion of said primary radiations are directed, a spectrograph detector positioned to receive and count the fluorescent rays emanating from said test specimen, a monitor detector positioned to receive and count radiations derived from said source, a relay connected to said monitor detector, said relay stopping the count of said spectrograph detector when a predetermined count has been made by said monitor detector, and a cover adjustably positioned in front of said monitor detector admitting fluorescent radiations at varying rates to the face of said monitor detector.

16. A device for spectrochemical analysis comprising a source of primary radiations, a test specimen to be analyzed on which a portion of said primary radiations are directed, a spectrograph detector positioned to receive and count the fluorescent rays emanating from said test specimen, a monitor detector positioned to receive and count radiations derived from said source, a relay connected to said monitor detector, said relay stopping the count of said spectrograph detector when a predetermined count has been made by said monitor detector, a cover adjustably positioned in front of said monitor detector admitting fluorescent radiations at varying rates to the face of said monitor detector, and indicating means responsive to the movement of said cover, said indicating means being calibrated with respect to various approximate percentages of elements contained in said test specimen such that for a given setting of said cover the final count of said spectrograph detector is a direct digital indication of the percentage content of a particular element in said test specimen.

17. The device according to claim 18 in which said cover has an opening in the form of a wedge slit.

18. In a device for spectrochemical analysis comprising a source of primary radiations, a test specimen to be analyzed on which a portion of said primary radiations are directed, and a spectrograph detector positioned to receive and count fluorescent radiations from said test specimen, a monitor detector system receiving and counting radiations derived from said source including a relay connected to a monitor detector, said relay stopping the count of said spectrograph detector when a predetermined count has been made by said monitor detector and a cover adjustably positioned in front of said monitor detector admitting fluorescent radiations at varying rates to the face of said monitor detector.

19. In a device for spectrochemical analysis comprising a source of primary radiations, a test specimen to be analyzed on which a portion of said primary radiations are directed, and a spectrograph detector positioned to receive and count fluorescent radiations from said test specimen, a monitor detector system receiving and counting radiations derived from said source including a relay connected to a monitor detector, said relay stopping the count of said spectrograph detector when a predetermined count has been made by said monitor detector and a cover adjustably positioned in front of said monitor detector admitting fluorescent radiations at varying rates to the face of said monitor detector, and indicating means responsive to the movement of said cover, and indicating means being calibrated with respect to various approximate percentages of elements contained in said test specimen such that for a given setting of said cover the final count of said spectrograph detector is a direct digital indication of the percentage content of a particular element in said test specimen.

20. The device according to claim 19 in which said cover has an opening in the form of a wedge slit.

21. A device for spectrochemical analysis comprising a test system having a source of primary radiations directed at a test specimen and detector and counting means for the fluorescent radiations from said test specimen, a monitoring system comprising additional detecting and counting means, said additional counting means counting only those radiations derived from said source of primary radiations which are of substantially the same quality as the radiations of said test system and a relay device connected to said additional counting means operating to interrupt the first said counting means upon a predetermined count being made by said additional counting means.

22. A device for spectrochemical analysis comprising a test system having a source of primary radiations directed at a test specimen and detector and counting means for the fluorescent radiations from said test specimen, a monitoring system comprising additional detecting and counting means detecting and counting only those radiations derived from said source of primary radiations which are of substantially the same quality as the fluorescent radiations from the test specimen and a relay device connected to said additional counting means operating to interrupt the first said counting means upon a predetermined count being made by said additional counting means.

23. A device for spectrochemical anlysis comprising a test system having a source of primary radiations directed at a test specimen and detector and counting means for the fluorescent radiations from said test specimen, a monitoring system comprising additional detecting and counting means, said additional counting means counting only those radiations derived from said source of primary radiations which are of substantially the same quality as those primary radiations which are effective in producing fluorescent radiations from said test specimen and a relay device connected to said additional counting means operating to interrupt the first said counting means.

24. A device for spectrochemical analysis comprising a test system having a source of primary radiations directed at a test specimen and detector and counting means for the fluorescent radiations from said test specimen, a monitor system comprising a quantum counter receiving radiations from said source of primary radiations, a pulse height selector and a counting scaler and relay, said counting scaler counting only pulses of amplitude proportional to the energy of quanta counted by the spectrograph detector, said relay operated to interrupt the first said counting means upon a predetermined count being made by said counting scaler.

25. A device for spectrochemical analysis comprising a test system having a source of primary radiations directed at a test specimen and detector and counting means for the fluorescent radiations from said test specimen, a monitor system comprising a proportional counter receiving radiations from said source of primary radiations, a pulse height selector and a counting scaler and relay, said counting scaler counting only pulses of amplitude proportional to the energy of quanta counted by the spectrograph detector, said relay operated to interrupt the first said counting means upon a predetermined count being made by said counting scaler.

26. A device for spectrochemical analysis comprising a test system having a source of primary radiations directed at a test specimen and detector and counting means for the fluorescent radiations from said test specimen, a monitor system comprising a scintillation counter receiving radiations from said source of primary radiations, a pulse height selector and a counting scaler and relay, said counting scaler counting only pulses of amplitude proportional to the energy of quanta counted by the spectrograph detector, said relay operated to interrupt the first said counting means upon a predetermined count being made by said counting scaler.

References Cited in the file of this patent

UNITED STATES PATENTS

| 2,264,725 | Shoupp et al. | Dec. 2, 1941 |
| 2,394,703 | Lipson | Feb. 12, 1946 |
| 2,442,752 | Armstrong | June 8, 1948 |
| 2,642,537 | Carroll et al. | June 16, 1953 |
| 2,739,242 | Armistead | Mar. 20, 1956 |